(12) United States Patent
Miyazaki

(10) Patent No.: US 7,052,096 B2
(45) Date of Patent: May 30, 2006

(54) VEHICLE ANTILOCK BRAKE CONTROL SYSTEM

(75) Inventor: Nagao Miyazaki, Osaka (JP)

(73) Assignee: Japan Electronics Industry Limited, Osaka (JP)

( * ) Notice: Subject to any disclaimer, the term of this patent is extended or adjusted under 35 U.S.C. 154(b) by 0 days.

(21) Appl. No.: 10/213,565

(22) Filed: Aug. 7, 2002

(65) Prior Publication Data

US 2002/0195874 A1    Dec. 26, 2002

Related U.S. Application Data

(63) Continuation of application No. 09/812,264, filed on Mar. 19, 2001, now abandoned, which is a continuation of application No. 08/825,846, filed on Apr. 4, 1997, now abandoned, which is a continuation of application No. 08/558,228, filed on Nov. 17, 1995, now abandoned, which is a continuation of application No. 08/112,495, filed on Aug. 26, 1993, now abandoned.

(30) Foreign Application Priority Data

Aug. 27, 1992 (JP) .................................. 4-272241

(51) Int. Cl.
B60T 7/20 (2006.01)

(52) U.S. Cl. .................. 303/123; 303/7; 73/11.07; 73/862.044

(58) Field of Classification Search .............. 303/9.61, 303/150, 113.1, 112, 20, 188–199, 123, 140–149, 303/6.01, 186, 187, 7–8; 188/112 A, 3 A; 73/121, 118.1, 862.041, 785, 794, 819, 862.042, 73/146, 862.628, 862.631; 701/71, 74, 80, 701/73

See application file for complete search history.

(56) References Cited

U.S. PATENT DOCUMENTS 3,479,074 A * 11/1969 Clouihgs .................... 303/123
3,503,654 A *  3/1970 Stamm ...................... 303/118.1
3,689,121 A *  9/1972 Kawabe et al. ........... 188/181 T
3,711,162 A *  1/1973 Steinbrenner et al. ........ 303/20

(Continued)

FOREIGN PATENT DOCUMENTS

EP    0025714    * 3/1981

(Continued)

OTHER PUBLICATIONS

"Antilock Brake System (M-ABS) Based on the Friction Coefficient Between the Wheel and the Road Surface", N. Miyasaki, M. Fukumoto, Y. Sogo and H. Tsukinoki, Japan Electronics Industry Ltd., SAE Technical Paper Series, International Congress and Exposition, Detroit, Michigan, Feb. 26-Mar. 2, 1990.*

Primary Examiner—Robert A. Siconolfi
(74) Attorney, Agent, or Firm—Jordan and Hamburg LLP

(57) ABSTRACT

A vehicular antilock brake control system does not require a lengthy extension piping from its actuator. The system provides for an accurate controlling method for maximizing a calculated road surface friction coefficient. Each wheel has a control unit consisting of a stress sensor, a controller and an actuator installed at the respective wheel. A stress value is detected, representative of road surface friction value or road surface friction coefficient value, for the corresponding wheel independently of the other wheels. In response to the output signal of the sensor, the controller regulates the actuator which controls brake fluid pressure applied to the respective wheel.

8 Claims, 6 Drawing Sheets

U.S. PATENT DOCUMENTS

| | | | |
|---|---|---|---|
| 3,724,914 A * | 4/1973 | Skoyles | |
| 3,756,661 A * | 9/1973 | Michellone | 303/7 |
| 3,980,350 A * | 9/1976 | Oeberg | |
| 4,085,979 A * | 4/1978 | Leiber et al. | 303/92 |
| 4,166,657 A * | 9/1979 | Blomberg et al. | 303/116.3 |
| 4,345,796 A * | 8/1982 | Reinecke | 303/92 |
| 4,363,523 A * | 12/1982 | Mattori et al. | 303/92 |
| 4,435,021 A * | 3/1984 | Hoenick | 303/10 |
| 4,456,309 A * | 6/1984 | Rath | 303/10 |
| 4,493,210 A * | 1/1985 | Fries et al. | 303/92 |
| 4,600,244 A * | 7/1986 | Leiber | 303/187 |
| 4,626,041 A * | 12/1986 | Harbour | 303/103 |
| 4,674,804 A * | 6/1987 | Burgdorf et al. | 303/112 |
| 4,685,745 A * | 8/1987 | Reinecke | 303/191 |
| 4,740,041 A * | 4/1988 | Pannbacker | 303/123 |
| 4,768,840 A * | 9/1988 | Sullivan et al. | 303/123 |
| 4,812,777 A | 3/1989 | Shirai | |
| 4,863,221 A * | 9/1989 | McNinch, Jr. | 303/9.66 |
| RE33,697 E * | 9/1991 | McNinch, Jr. | 303/123 |
| 5,090,779 A * | 2/1992 | Kramer | 303/92 |
| 5,136,511 A * | 8/1992 | Pannbacker | 303/187 |
| 5,186,042 A * | 2/1993 | Miyazaki | 73/118.1 |
| 5,211,449 A * | 5/1993 | Amtsfeld | 303/7 |
| 5,255,962 A * | 10/1993 | Neuhaus et al. | 303/111 |
| 5,288,139 A * | 2/1994 | Singleton et al. | 303/15 |
| 5,303,986 A * | 4/1994 | VanDeMotter et al. | 303/15 |
| 5,462,342 A * | 10/1995 | Goebels | 303/118.1 |
| 5,507,187 A * | 4/1996 | Miyazaki | |
| 5,569,857 A * | 10/1996 | Miyazaki | |
| 5,723,792 A * | 3/1998 | Miyazaki | 73/769 |
| 5,892,139 A * | 4/1999 | Miyazaki | |
| 5,938,713 A * | 8/1999 | Miyazaki | 701/71 |
| 5,964,511 A * | 10/1999 | Miyazaki | 303/150 |
| 5,979,995 A * | 11/1999 | Miyazaki | 303/150 |
| 6,006,597 A * | 12/1999 | Miyazaki | 73/862.042 |
| 6,032,520 A * | 3/2000 | Miyazaki | 73/862.631 |
| 6,050,126 A * | 4/2000 | Miyazaki | 73/862.044 |
| 6,109,115 A * | 8/2000 | Miyazaki | 73/862.044 |

FOREIGN PATENT DOCUMENTS

| | | | | |
|---|---|---|---|---|
| EP | 0467112 A2 * | 1/1992 | | |
| EP | 0748730 | * | 12/1996 | |
| EP | 0788955 | * | 8/1997 | |
| GB | 1359487 | * | 7/1974 | |
| GB | 2162267 | * | 1/1986 | 303/188 |
| GB | 2168445 A * | 6/1986 | | |
| JP | 57-77244 | * | 5/1982 | 188/181 T |
| JP | 57-080956 | | 5/1982 | |
| JP | 62-077270 | | 4/1987 | |
| JP | 63-020256 | | 1/1988 | |
| JP | 3-273948 | | 5/1991 | |
| JP | 3-215726 | | 9/1991 | |
| JP | 3-220056 | * | 9/1991 | 303/112 |
| JP | 4331336 | * | 11/1992 | |
| WO | 92-12880 | * | 8/1992 | 303/116.3 |

* cited by examiner

VEHICLE ANTILOCK BRAKE CONTROL SYSTEM

This application is a continuation of application Ser. No. 09/812,264, filed Mar. 19, 2001, now abandonded, which is a Continuation of Ser. No. 08/825,846 filed Apr. 4, 1997, now Abandoned, which is a Continuation of Ser. No. 08/558,228 filed Nov. 17, 1995, now Abandoned, which is a Continuation of Ser. No. 08/112,495 filed Aug. 26, 1993, now Abandoned.

BACKGROUND OF THE INVENTION

The present invention relates to a novel system for controlling a vehicle antilock brake system (ABS) by means of stress sensors for detecting road surface friction forces of road surface friction coefficients for respective wheels which insures safe steering without locking of its wheels even during sudden braking.

There has been a mounting interest in the so-called antilock brake system which controls the brake fluid pressure on the wheel within a certain range (about 20%) of slip ratio between braking force and cornering force during sudden braking and an increasing number of vehicles are carrying such ABS systems for safe steering even during sudden braking.

The antilock brake system generally comprises a wheel speed sensor for detecting the locking tendency of the tire (wheel), a controller for outputting an actuator drive command according to the current wheel speed data and an actuator which, in response to said drive command, adjusts the brake fluid pressure. Among the known modes of ABS control are the three-system control (selectro-control) mode in which the brake fluid pressures to the front right and left wheels are independently controlled and, with one of the two rear wheels which is more liable to be locked as a reference, the brake fluid pressures for both rear wheels are controlled as a unit. A two-system control exists in which the front and rear wheels are respectively controlled as units or the diagonally located wheels are simultaneously controlled. Also, a simultaneous front and rear wheel control mode exists in which one of the rear wheels is controlled by the selectro-control method and with one of the front wheels which is harder to control as a reference, the brake fluid pressures to the two front wheels are simultaneously controlled.

Since the conventional antilock brake system described above uses one controller for controlling the brake fluid pressures to the four wheels either through three-system control or through two-system control, a long pipeline is required between the wheel cylinder of each wheel and the actuator. In the case of a large-sized vehicle such as a trailer or a large bus, which has a great overall length, the brake fluid pipeline has to span a great distance, with the result that not only a time lag is inevitable after the actuator receives a drive command and before the wheel cylinder of the wheel is supplied with a brake fluid pressure but also a transmission loss of the brake fluid pressure is liable to occur, so that the system cannot provide for exact brake control and, hence, cannot be said to be a fully safe antilock brake system.

The conventional ABS employing wheel speed sensors is a system which automatically controls the brake so as to bring the slip ratio into a certain range based on chassis speed and wheel speed but since the relationship between road surface friction coefficient and slip ratio is a variable dependent on the changing road surface condition, the conventional system may not provide for the maximal braking force depending on the road surface condition, with the result that the minimum braking distance cannot be insured for certain.

Furthermore, since the chassis speed is a value estimated from wheel speeds, the accuracy of slip ratio control is not high enough and in order to find the exact chassis speed, a complicated device such as a ground speed sensor or a chassis deceleration sensor is needed.

SUMMARY OF THE INVENTION

Designed to overcome the above drawbacks of the prior art, the present invention has for its object to provide an ABS control system by which the right and left front and rear wheels of a vehicle are independently subjected to brake fluid pressure control through the utilization of a wheel sensor means adapted to directly detect the road surface friction force or road surface friction coefficient to thereby provide for exact anitlock brake control.

The invention provides an ABS control device comprising a plurality of control units each provided for each wheel or each set of wheels and consisting of a stress sensor for detecting a wheel stress such as road surface friction force or road surface friction coefficient, an actuator controller and an actuator for controlling a brake fluid pressure, the stress sensor detecting the stress, such as road surface friction force or road surface friction coefficient, of the corresponding wheel according to road surface condition and the controller responding to the signal output of the stress sensor to cause the actuator to adjust the brake fluid pressure so that the respective wheels are independently controlled.

According to a feature of the invention, the stress values such as road surface friction force or road surface friction coefficient values for respective wheels are independently detected automatically on sudden braking, the corresponding controllers of the respective control units output drive signals to the corresponding actuators according to the respective detection signals, and the actuators independently control the brake oil or air brake pressures so that the antilock brake system for each wheel or each set of wheels functions independently of the corresponding systems for the other wheels.

As will be understood from the above description, the invention comprises control units each consisting of a stress sensor for detecting the road surface friction force or road surface friction coefficient value, a controller and an actuator, each of the units being installed close to the corresponding wheel, so that it is no longer necessary to provide long hydraulic fluid lines, nor is there a time lag between a drive command from the controller and the application of a brake fluid pressure with the consequent improvement in braking precision. Moreover, each wheel or set of wheels can be provided with an antilock brake system which functions independently of the corresponding systems for the other wheels or sets of wheels, in which cases the antilock brake systems work independently according to detected stress values such as road surface friction force or road surface friction coefficient values for the respective wheels or sets of wheels so that a vehicle equipped with highly safe antilock brake systems can be provided.

The invention further provides an ABS control system wherein the respective control units are supplied with a control hydraulic pressure from a foot brake master cylinder.

In accordance with a feature of the invention, the control units provided for respective wheels are supplied with hydraulic fluid pressures from a single master cylinder and the respective actuators receiving drive commands from the corresponding controllers function independently to adjust the brake fluid pressures so that the antilock brake systems can be independently actuated for the respective wheels.

The invention also provides an ABS control system wherein control hydraulic oil sources for control units are provided for respective wheels or sets of wheels and each of said control oil sources comprises a high pressure control pressure generating means, a fluid reservoir means and a reversing means, so that the respective wheels or sets of wheels may be independently controlled.

In accordance with another feature of the invention, the control unit for each wheel or set of wheels is provided with a high-pressure control pressure generating means, a hydraulic oil reservoir means and a reversing means, thus shortening the pipelines connecting the respective controllers to the corresponding actuators and allowing each control unit to function independently and with high precision.

The invention further features an ABS control system wherein the control hydraulic pressure source is supplied with an auxiliary oil pressure from a foot brake master cylinder.

According to another feature of the invention, any deficiencies in control pressure in the control pressure sure generating means are compensated for by an auxiliary supply of pressure from the foot brake master cylinder so that the actuators of the respective control units can be driven at necessary hydraulic pressures with high precision.

The invention further provides an ABS control system wherein the control units are actuated on application of a sudden brake or receipt of the corresponding signal and the operations of the respective control units are coordinated and controlled by a central controller.

According to another feature of the invention, the operations of the control units provided for the respective wheels or sets of wheels are coordinated by a central controller so that a good coordination of the respective ABSs can be obtained.

DETAILED DESCRIPTION OF THE PREFERRED EMBODIMENT

The preferred embodiments of the present invention are now described in detail with reference to the accompanying drawings.

Figure 1:
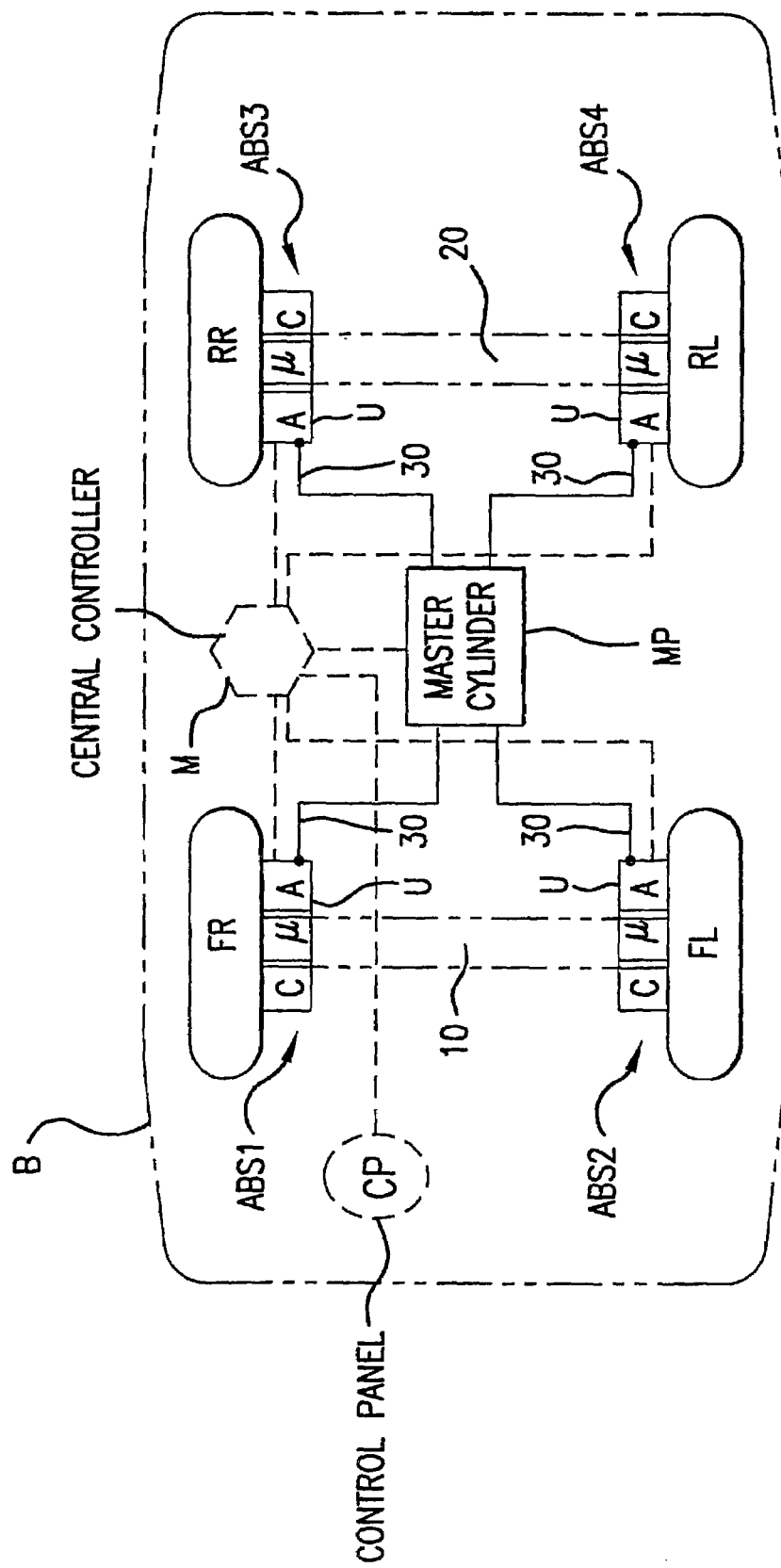
FIG. 1 is a basic hardware block diagram illustrating a vehicle ABS control system according to the present invention as claimed in claim 1.

FIG. 1 is a basic hardware block diagram illustrating the vehicle antilock brake system control according to claim 1 as applied to a passenger car.

Referring to FIG. 1, this vehicle ABS control system comprises four control units U each consisting of three elements, namely a strain sensor μ adapted to directly detect a wheel stress such as road surface friction force or road surface friction coefficient, a controller C comprising a microcomputer or the like and adapted to output a command signal, and an actuator A, which is adapted to adjust the brake fluid pressure according to the command signal as respectively mounted on the front axle 10 and rear axle 20 of a vehicle B in correspondence with the front right wheel FR, front left wheel FL, rear right wheel RR and rear left wheel RL thereof in such a manner that they may independently detect the stress values, such as road surface friction force or road surface friction coefficient values, for the corresponding wheels to thereby allow the respective wheels to be controlled independently of the others, said actuator A of each control unit U being connected to a master cylinder MP of a foot brake through a brake fluid line 30 so as to constitute antilock brake systems ABS1, ABS2, ABS3 and ABS4 for independent control of the respective wheels.

Figure 5:
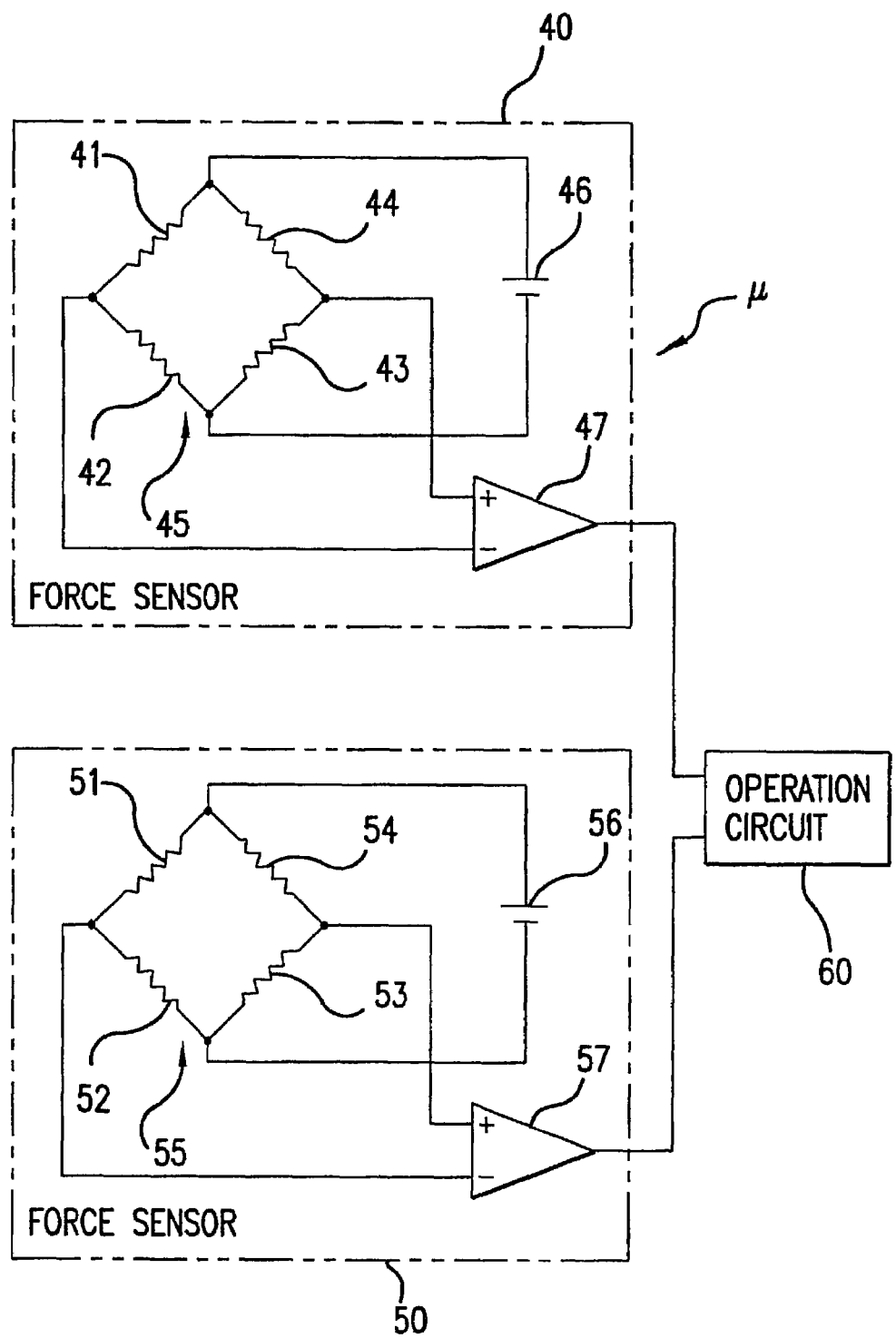
FIG. 5 is a circuit diagram showing-an exemplary stress sensor system.

Referring to FIG. 5, the stress sensor μ con, for example, be the road surface friction coefficient detector which the present applicant has disclosed in Japanese Patent Application H-3-130840. Thus, the road surface coefficient detector comprises a road surface friction force sensor 40 consisting of 4 strain gauges 41–44 affixed on both sides of a plastic, silicon or metal wafer in a perpendicular arrangement to form a bridge 45 and installed in a hole provided in the axle or any structure close to the axle. A potential 46 is applied to the bridge 45 and output terminals of the bridge 45 are connected to an amplifier 47 so as to determine the stress on the axle or the structure adjacent therefor and thereby detect the road surface friction force. A vertical load sensor 50 is constructed in the same manner as above, for detecting the vertical reaction load. Four strain gauges 51–54 form a bridge 55. A potential 56 is applied to the bridge 55 and an output of the bridge 55 is processed by an amplifier 57. As shown in FIG. 5, these two sensors 40 and 50 are connected to an operation circuit 60 to divide the road surface friction force by the vertical reaction load output to output a road surface friction coefficient. The controller C is a microcomputer or an LSI electronic controller.

Figure 6:
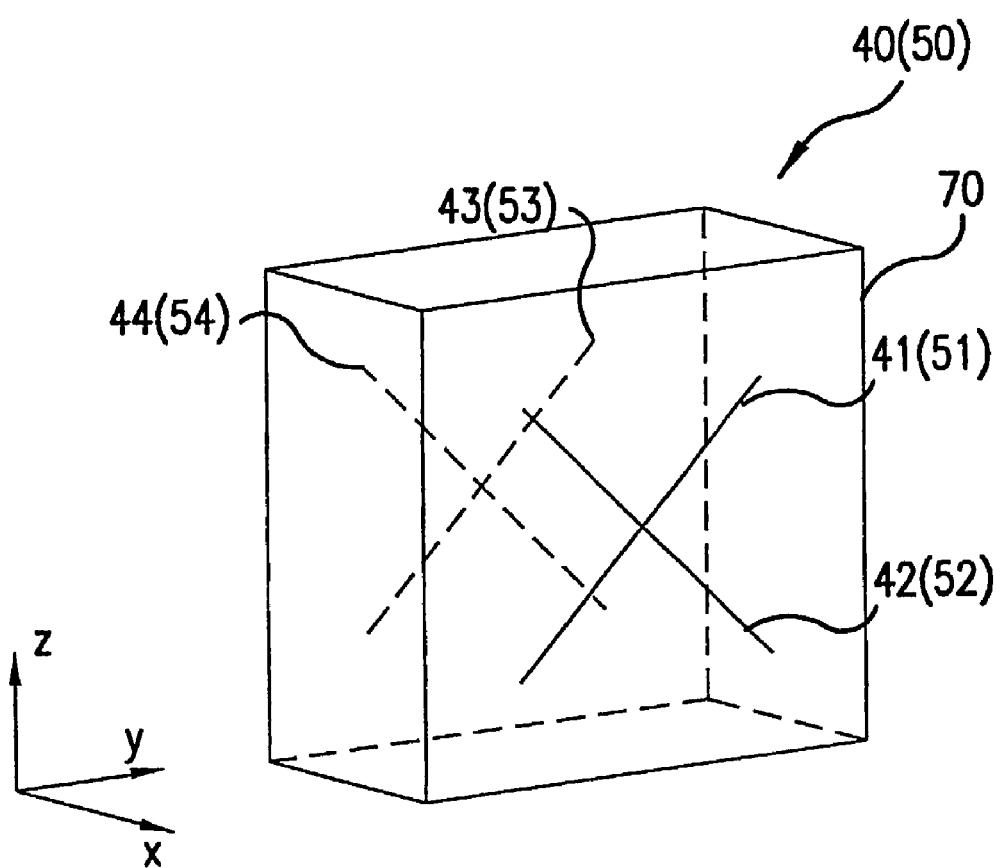
FIG. 6 is a perspective drawing of an embodiment of a bridge of FIG. 5.

Referring to FIG. 6, an embodiment of the bridges 45 and 55 of FIG. 5 is shown which is used to measure either the road surface frictional force or the vertical drag in application. Thus, each of the strain gauges 4–44 (51–54) is preferably installed at an angle of 45° with respect to the y-axis. For the purpose of measuring the road surface frictional force, the x, y and z axes in FIG. 6 are preferably coincident with the vertical direction, direction of wheel advance and axle direction, respectively. For the purpose of measuring the vertical drag, the x, y and z axes in FIG. 6 are preferably coincident with the direction of wheel advance, vertical direction and axle direction. The relationship of the bridges 45 and 55 installation position to and axle centerline is such that opposing sides of the bridges 45 and 55 installation position to and axle centerline is such that opposing sides of the bridges 45 and 55 straddle the centerline of the axle. The centerline of the axle is line of zero bending strain and zero shear strain due to torsional stress. The strain gauges 41–44 (51–54) are connected to a signal processing circuit shown in FIG. 5. Thus, they are formed into bridges 45 and 55 which, in turn, is connected to the amplification circuits 47 and 57. These amplification circuits 47 and 57 output signals to operation circuit 60.

The strain sensor μ need not be the above-mentioned detector utilizing strain gauges but may for example be a semiconductor sensor, shear stress sensor, acceleration sensor, chassis speed sensor, wheel speed sensor or the like.

The control unit U need not be an integral assembly of the stress sensor μ, controller C and actuator A but these components may be disposed near the wheel or axle independently but operatively associated with one another so that they may function in the optimum manner to provide for necessary control according to wheel stress detection signals.

As the driver suddenly brakes, the stress sensors μ of the respective control units U independently detect stresses, such as current road surface friction forces or road surface friction coefficients, and independently transmit detection signals to the corresponding controllers C which are adapted to output drive commands to the corresponding actuators A. The respective actuators A receiving the drive commands from the controllers C according to the detection signals for the respective wheels are driven independently so that an antilock brake may be applied independently for each wheel. As indicated by broken lines in FIG. 1, a central controller M providing for a failsafe telemetering monitor of the ABS control status of each wheel and a coordination of the respective wheel actions controls the operation of the respective control units U so that the actions of the antilock brakes for the wheels can be efficiently coordinated. The ABS is controlled according to the strain sensor output signal representing the road surface friction force or road surface friction coefficient. As shown, CB represents control panel.

Figure 2:
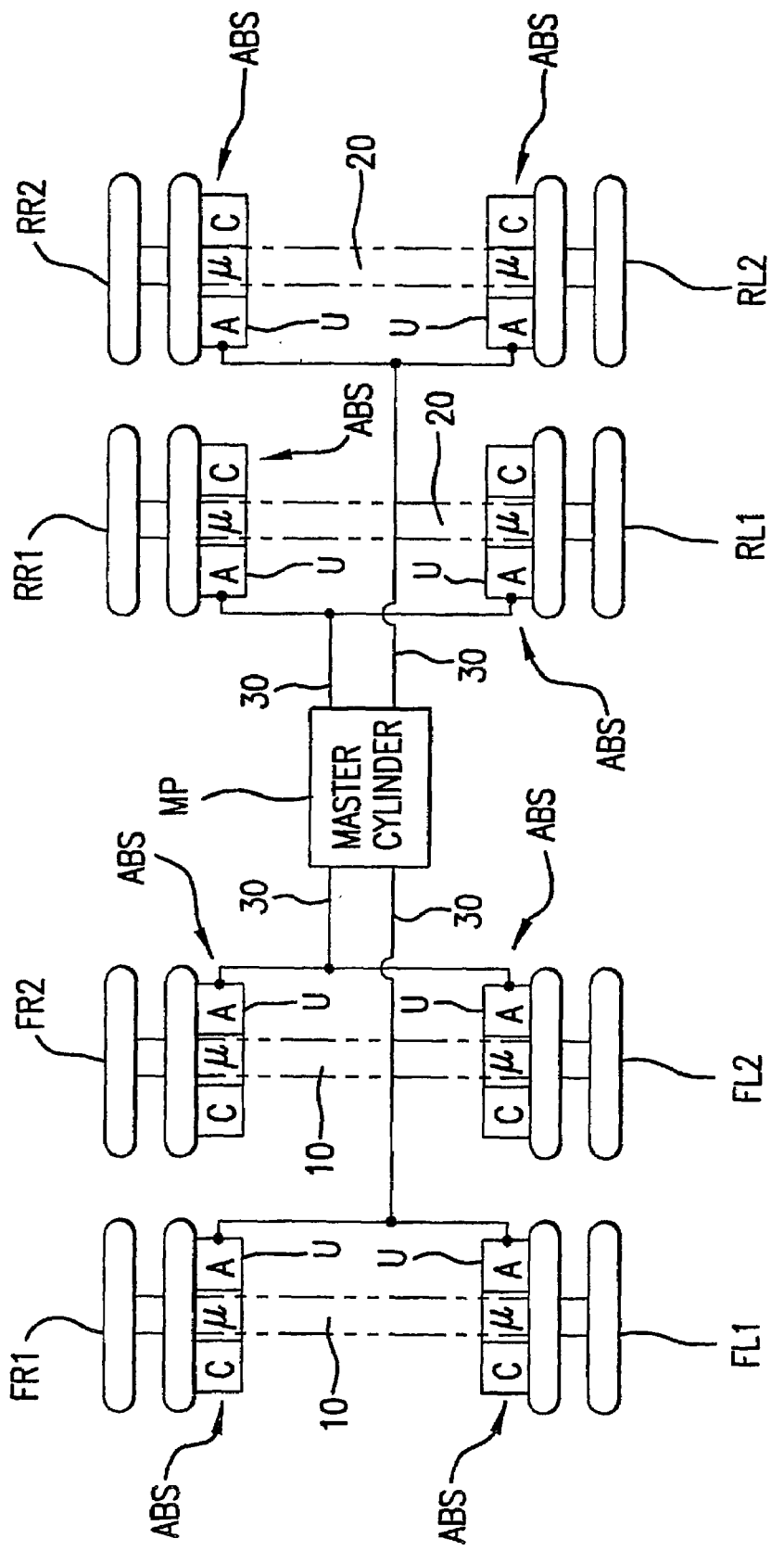
FIG. 2 is a hardware block diagram illustrating an embodiment in which the vehicle antilock system control device of the invention is applied to a large-sized bus.

FIG. 2 shows an embodiment in which the ABS control system of the invention is mounted on a large-sized bus of the two-front axle/8-wheel and two-rear axle/8-wheel type. The above-mentioned control unit U is provided for each of the front axles 10,10 and rear axles 20,20 so that the respective control units U may independently detect stress values, such as road surface friction force or road surface friction coefficient values, for the front right wheels FR1, FR2, front left wheels FL2, FL2, and rear right wheels RR2, RR2 and rear left wheels RL1, RL2 mounted on the front axles 10,10 and rear axles 20,20, and actuators A of these control units U are supplied with a brake fluid from a master cylinder MP.

In this manner, the bus is equipped with 8 independently acting an antilock brake systems in a total of 8 positions, namely 4, positions, right and left, for the front wheels and 4 positions, right and left, for the rear wheels. The respective actuators A receive drive commands from the corresponding controllers according to detected stress values, such as road surface friction force or road surface friction coefficient values, for the respective wheels too adjust the brake fluid pressures independently. Thus, the antilock brakes for respective wheels can be independently actuated without requiring extended brake fluid lines.

Figure 3:
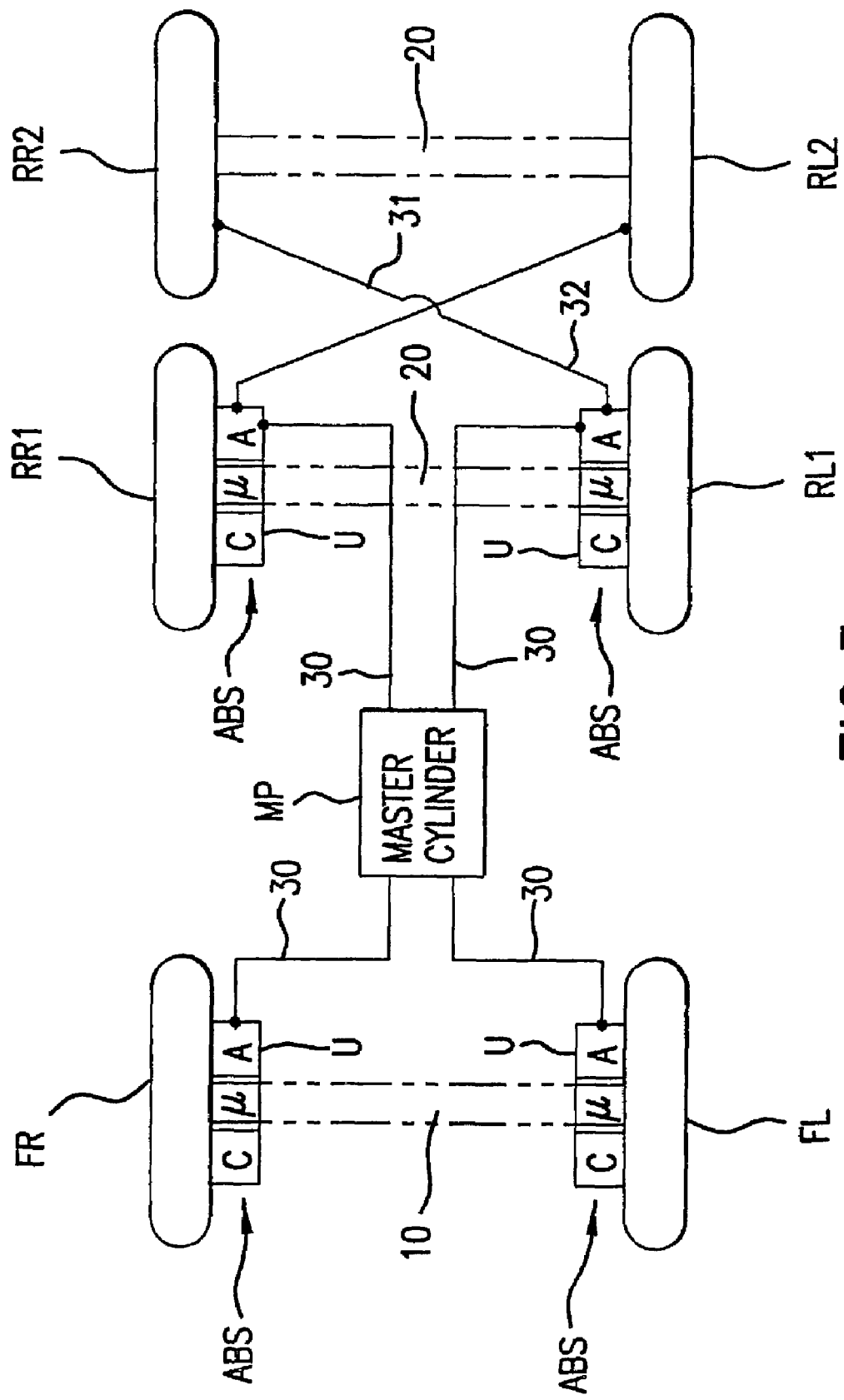
FIG. 3 is a hardware block diagram illustrating an embodiment of the invention in which the vehicle antilock brake system control device of the-invention is applied to a trailer.

FIG. 3 shows an embodiment in which the ABS control system of the invention is applied to a:trailer of the front 1-axle/2-wheel, rear two-axle/4-wheel diagonal two-wheel simultaneous control type. Here, the independently acting control unit U is provided in a total of 4 positions, namely 2 positions, right and left, for the front wheels and 2 positions, right and left, for the four rear wheels, with the rear right wheel RR2 being connected to the control unit U for the rear left wheel RL1 through a connecting pipe 31 and the rear left wheel RL2 to the control unit U for the rear right wheel RR1 through a connecting pipe 32. The actuators A of these four control units U are respectively supplied faith brake fluid from the master cylinder MP.

The trailer is, thus., equipped with independently acting antilock brake systems ABC in two positions, right and left, for the front wheels and two positions, right and left, for the four rear wheels. The respective actuators A of said control units receive drive commands from the corresponding controllers C according to detected stress values, such as road surface friction force or road surface friction coefficient values, for each front wheel and for each couple of rear wheels couples to adjust the brake fluid pressures acting on the respective wheels independently. Thus, antilock brakes can be applied for sudden stopping without regard to chassis length or axle-to-axle distance for each front wheel and for each couple of rear wheels independently.

Figure 4:
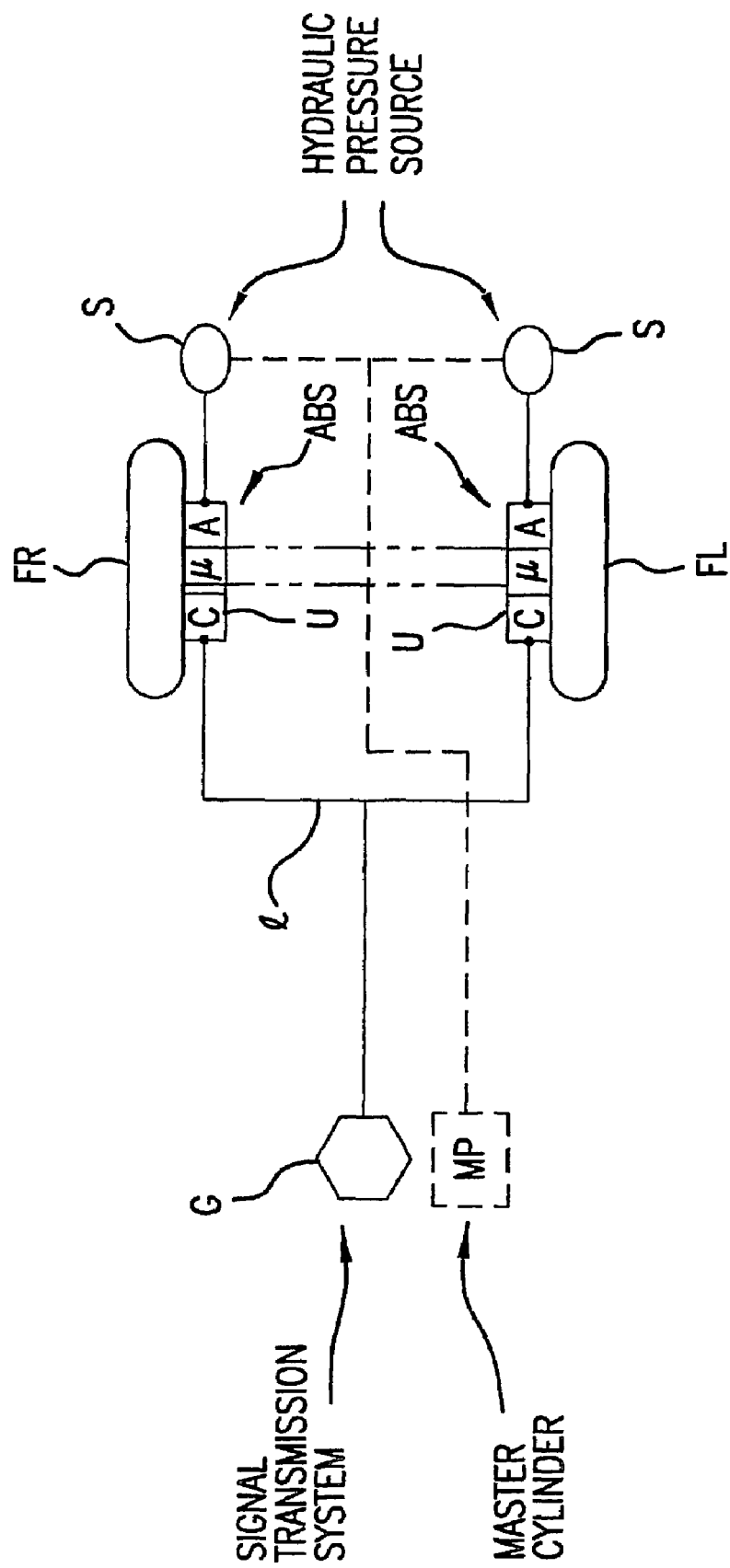
FIG. 4 is hardware block diagram illustrating another embodiment of a vehicle antilock brake system control device of the present invention.

In the above embodiment, the actuator A of each control unit is supplied with a brake fluid from the master cylinder MP through a brake fluid line 30 and, therefore, complexity is introduced by the routing of the fluid line 30. However, when a control hydraulic pressure source S comprising a high-pressure control hydraulic pressure generating means, a fluid reservoir means and a reversing means is disposed for each control unit U as shown in FIG. 4. Brake fluid line can be dispensed with and an antilock brake system having its own control hydraulic pressure source can be independently provided for each wheel or each set of wheels. Moreover, when a foot brake master cylinder MP is additionally provided as indicated by broken lines in FIG. 4 so as to make up for deficiencies in brake fluid pressure in the control, hydraulic pressure sources S, the actuators of the respective control units can be driven at exact fluid pressures for precision control. In FIG. 4, the letter G represents a signal transmission system comprising a microcomputer or the like and 1 represents its signal line.

While the above embodiments have been described with reference to hydraulic oil brake control, the present invention is not limited to such hydraulic oil control but can be applied to pneumatic brake control with equal success.

What is claimed is:

1. An anti-lock brake control system of a large-size vehicle having first and second end portions, comprising:
    two adjacent axles proximate the first end portion of the large-size vehicle and wheels mounted on each of respective ends of the axles, each of the wheels on one of the axles being diagonally opposite a respective other of said wheels on the other axle;
    a third axle proximate the second end portion of the large-size vehicle, the third axle being spaced further from each of the two adjacent axles than the two adjacent axles are spaced from each other; and
    two control units, each of the two control units being associated with a respective one of the wheels on said one axle, each of the two control units including:
        a stress sensor for detecting strain of the associated wheel on said one axle,
        a controller for providing an actuating signal in response to output signals from the stress sensor, and
        an actuator for adjusting brake fluid pressure applied to the associated wheel on said one axle, and
    wherein each one of the two control units also adjusts the brake fluid pressure applied to the wheel on said other axle diagonally opposite the wheel with which said one of the control units is associated.

2. The control system of claim 1, wherein each control unit is supplied with a brake fluid pressure from a foot brake master cylinder.

3. The control system of claim 2, wherein each said stress sensor is a road surface friction coefficient detector utilizing a road surface friction force sensor and a vertical load sensor, each of said sensors comprising strain gauges for detecting the road surface friction force and the vertical reaction load, respectively.

4. The control system of claim 3, wherein the first end portion is a rear end of the vehicle and the second end portion is a front end of the vehicle.

5. The control system of claim 1, wherein each said stress sensor is a road surface friction coefficient detector utilizing a road surface friction force sensor and a vertical load sensor, each of said sensors comprising strain gauges for detecting the road surface friction force and the vertical reaction load, respectively.

6. The control system of claim 5, wherein the first end portion is a rear end of the vehicle and the second end portion is a front end of the vehicle.

7. The control system of claim 1, wherein the first end portion is a rear end of the vehicle and the second end portion is a front end of the vehicle.

8. The control system of claim 7, wherein each control unit is supplied with a brake fluid pressure from a foot brake master cylinder.

* * * * *